United States Patent
Choi et al.

(10) Patent No.: US 12,288,866 B2
(45) Date of Patent: Apr. 29, 2025

(54) METHOD FOR PREPARING POSITIVE ELECTRODE ACTIVE MATERIAL

(71) Applicant: LG Chem, Ltd., Seoul (KR)

(72) Inventors: Sang Soon Choi, Daejeon (KR); Seung Beom Cho, Daejeon (KR); Jung Ho Lim, Daejeon (KR); Won Sig Jung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 331 days.

(21) Appl. No.: 16/614,233

(22) PCT Filed: Nov. 23, 2018

(86) PCT No.: PCT/KR2018/014518
§ 371 (c)(1),
(2) Date: Nov. 15, 2019

(87) PCT Pub. No.: WO2019/103522
PCT Pub. Date: May 31, 2019

(65) Prior Publication Data
US 2020/0350554 A1    Nov. 5, 2020

(30) Foreign Application Priority Data
Nov. 24, 2017   (KR) .................. 10-2017-0158817

(51) Int. Cl.
| H01M 4/1391 | (2010.01) |
| H01M 4/04 | (2006.01) |
| H01M 4/505 | (2010.01) |
| H01M 4/525 | (2010.01) |
| H01M 4/02 | (2006.01) |

(52) U.S. Cl.
CPC ......... *H01M 4/0471* (2013.01); *H01M 4/505* (2013.01); *H01M 4/525* (2013.01); *H01M 2004/028* (2013.01)

(58) Field of Classification Search
CPC .... H01M 4/0471; H01M 4/505; H01M 4/525; H01M 2004/028; H01M 4/485; H01M 10/052; C01G 53/54; C01G 53/50; C01G 53/00; C01G 53/44; C01P 2002/52; C01P 2002/60; C01P 2006/40; Y02E 60/10
See application file for complete search history.

(56) References Cited

U.S. PATENT DOCUMENTS

| 4,385,045 A * | 5/1983 | Thompson ......... C01G 49/0081 |
| | | 423/594.2 |
| 5,370,948 A | 12/1994 | Hasegawa et al. |
| 2011/0008678 A1 * | 1/2011 | Li .................. H01M 4/5825 |
| | | 252/182.1 |
| 2011/0033750 A1 | 2/2011 | Hosokawa et al. |
| 2012/0161069 A1 | 6/2012 | Nagai et al. |
| 2012/0319037 A1 | 12/2012 | Kawahashi et al. |
| 2013/0302688 A1 | 11/2013 | Takezawa |
| 2014/0030598 A1 | 1/2014 | Sakano et al. |
| 2015/0380720 A1 | 12/2015 | Kim et al. |
| 2016/0049644 A1 * | 2/2016 | Lee ................. H01M 4/366 |
| | | 429/231.95 |
| 2016/0365576 A1 * | 12/2016 | Eguchi ............... H01M 4/525 |
| 2017/0025715 A1 | 1/2017 | Saka et al. |
| 2017/0301908 A1 * | 10/2017 | Lee .................. C01G 53/42 |
| 2018/0212237 A1 | 7/2018 | Lee et al. |
| 2018/0261832 A1 | 9/2018 | Nho et al. |

FOREIGN PATENT DOCUMENTS

| CN | 106104856 A | 11/2016 |
| CN | 104779385 B | 9/2017 |
| JP | H09259881 A | 10/1997 |
| JP | 2005251756 A | 9/2005 |
| JP | 2007214118 A | 8/2007 |
| JP | 201070431 A | 4/2010 |
| JP | 2010211925 A | 9/2010 |
| JP | 2011076916 A | 4/2011 |
| JP | 2011515813 A | 5/2011 |
| JP | 5153189 B2 | 2/2013 |
| JP | 2013077420 A | 4/2013 |
| JP | 201617017 A | 2/2016 |
| JP | 2016-095980 * | 5/2016 ............. H01M 4/36 |
| JP | 2016091626 A | 5/2016 |
| JP | 2016095980 A | 5/2016 |
| KR | 20050082148 A | 8/2005 |
| KR | 20050083869 A | 8/2005 |

(Continued)

OTHER PUBLICATIONS

Liu (Comparative studies of zirconium doping and coating on LiNi0.6Co0.2Mn0.2O2 cathode material at elevated temperatures, Journal of Power Sources 396 (2018) 288-296).*

(Continued)

*Primary Examiner* — Cynthia K Walls
(74) *Attorney, Agent, or Firm* — Lerner David LLP

(57) ABSTRACT

A method for preparing a positive electrode active material includes: a step for adding a reaction mixture containing a lithium-raw material and a nickel-manganese-cobalt precursor into a first crucible and performing a first heat treatment at a temperature of 500-800° C. to form a pre-sintered mixture; a step for extracting the pre-sintered mixture from the first crucible and pulverizing or classifying the same; and a step for adding the pulverized or classified pre-sintered mixture into a second crucible and performing a second heat treatment at a temperature of 700-1000° C. under an atmosphere in which an oxygen partial pressure is 20% or less to form a lithium nickel-manganese-cobalt-based positive electrode active material, wherein a volume of the pre-sintered mixture formed after the first heat treatment is reduced to a volume that is 20-50% of a volume of the reaction mixture added into the first crucible.

12 Claims, No Drawings

(56) References Cited

FOREIGN PATENT DOCUMENTS

| KR | 20140101915 A | 8/2014 |
|---|---|---|
| KR | 20160063982 A | 6/2016 |
| KR | 20160120314 A | 10/2016 |
| KR | 20170103662 A | 9/2017 |
| KR | 20170103699 A | 9/2017 |
| WO | 2012101970 A1 | 8/2012 |
| WO | 2012144021 A1 | 10/2012 |
| WO | 2015064478 A1 | 5/2015 |

OTHER PUBLICATIONS

Machine translation of JP 2016-095980, retrieved from <www.espacenet.com> on Aug. 1, 2024 (Year: 2024).*
Search Report for Chinese Application No. 201880033661.0 dated Aug. 2, 2021. 3 pgs.
International Search Report from PCT/KR2018/014518, dated Apr. 23, 2019, pp. 1-4.
Extended European Search Report including Written Opinion for Application No. EP18881387.7 dated Jun. 22, 2020, 6 pgs.

* cited by examiner

METHOD FOR PREPARING POSITIVE ELECTRODE ACTIVE MATERIAL

TECHNICAL FIELD

Cross-Reference to Related Applications

The present application is a National Stage Entry under 35 U.S.C. § 371 of International Application No. PCT/KR2018/014518 filed on Nov. 23, 2018 which claims priority to Korean Patent Application No. 10-2017-0158817, filed on Nov. 24, 2017, the entire contents of which are incorporated herein by reference.

TECHNICAL FIELD

The present invention relates to a method for preparing a positive electrode active material, and more particularly, to a method for preparing a lithium nickel-manganese-cobalt oxide-based positive electrode active material having excellent productivity and having excellent quality uniformity and physical properties.

BACKGROUND ART

As the technology development and demand for mobile devices have increased, the demand for secondary batteries has been rapidly increasing as an energy source, and among the secondary batteries, a lithium secondary battery having high energy density and voltage, long cycle life, and low self-discharge rate is commercialized and widely used.

Various lithium transition metal oxides such as $LiCoO_2$, $LiNiO_2$, $LiMnO_2$, $LiMn_2O_4$, $LiFePO_4$, $Li(Ni_aCo_bMn_c)O_2$ (wherein a, b, and c are each independently an atomic fraction of oxide composition elements, 0<a<1, 0<b<1, 0<c<1, and a+b+c=1) have been developed as a positive electrode active material for a lithium secondary battery. Among these oxides, $Li(Ni_aCo_bMn_c)O_2$ has been actively studied in recent years because it has an advantage of being used for a high capacity and high voltage battery.

The conventional lithium nickel-manganese-cobalt-based oxide is prepared through a method that a precursor such as nickel-manganese-cobalt hydroxide and a lithium-raw material such as lithium hydroxide or lithium carbonate are mixed, and thereafter, the mixture is added into a crucible and fired at a high temperature of about 750-950° C.

However, such a conventional method has a problem that since the nickel-manganese-cobalt precursor and the lithium-raw material are mixed to increase a volume thereof, an amount of the raw material to be added into the crucible is reduced, thereby deteriorating productivity. When the amount of the raw material to be added into the crucible is increased to improve the productivity, quality variation of the positive electrode active materials formed in the same crucible after the firing seriously occurs because the firing occurs ununiformly. In addition, there is a problem that an unnecessary gas such as $CO_2$ is generated in the firing process and adversely affects the quality of the positive electrode active material.

Furthermore, a high-concentration nickel lithium nickel-manganese-cobalt-based positive electrode active material having a nickel content of 60 mol % or more has been developed in recent years to improve capacity characteristics, and such a lithium nickel-manganese-cobalt-based positive electrode active material having high nickel content is generally fired under an oxygen atmosphere in which an excessive amount of oxygen is added to oxidize $Ni^{+2}$ to $Ni^{+3}$.

However, when the firing is performed in an oxygen atmosphere, there are problems that temperature variation in the firing furnace severely occurs and the firing is performed for a long time because the oxygen partial pressure has to penetrate into the inside of the fired product.

Prior Art Document (Patent Document 1) KR 2005-0083869 A (Aug. 26, 2005)

DISCLOSURE OF THE INVENTION

Technical Problem

To solve the above problems, an aspect of the present invention provides a method for preparing a positive electrode active material through which a positive electrode active material can be prepared through two steps of firing at different heat treatment temperatures and atmospheres to provide a lithium nickel-manganese-cobalt-based positive electrode active material having uniform and excellent quality.

Another aspect of the present invention also provides a method for preparing a lithium nickel-manganese-cobalt-based positive electrode active material having excellent productivity through which a larger amount of a positive electrode active material than the conventional active materials based on a crucible having the same volume can be obtained.

Technical Solution

According to an aspect of the present invention, there is provided a method for preparing a positive electrode active material, the method including: a step for adding a reaction mixture containing a lithium-raw material and a nickel-manganese-cobalt precursor into a first crucible and performing a first heat treatment at a temperature of 500-800° C. to form a pre-sintered mixture; a step for extracting the pre-sintered mixture from the first crucible and pulverizing or classifying the same; and a step for adding the pulverized or classified pre-sintered mixture into a second crucible and performing a second heat treatment at a temperature of 700-1000° C. under an atmosphere in which an oxygen partial pressure is 20% or less to form a lithium nickel-manganese-cobalt-based positive electrode active material, wherein a volume of the pre-sintered mixture formed after the first heat treatment is 20-50% with respect to a volume of the reaction mixture added into the first crucible.

Advantageous Effects

According to the preparing method of the present invention, a lithium nickel-manganese-cobalt-based positive electrode active material having a large crystal size, and excellent physical properties and electrochemical characteristics due to less cation mixing is obtained through performing two steps of heat treatment at different heat treatment temperature and atmosphere.

In addition, according to the preparing method of the present invention, a relatively large amount of the pre-sintered mixture is added into a crucible for a second heat treatment because a first heat treatment of a reaction mixture is performed at a temperature of 500-800° C. to form a pre-sintered mixture having a reduced volume as compared with the reaction mixture, and accordingly, productivity is greatly excellent. Specifically, according to the preparing method of the present invention, a yield of 2-6 times higher than that of the conventional one step firing method is obtained in a crucible having the same volume.

In addition, according to the preparing method of the present invention, even when firing is performed under a low oxygen partial pressure, a positive electrode active material having excellent quality is obtained because unnecessary gas such as $CO_2$ or moisture is released during a first heat treatment and a secondary heat treatment is performed in a state that such by-products are removed.

In addition, according to the preparing method of the present invention, unevenness in quality of the positive electrode active material depending on a position thereof in a crucible is effectively solved.

MODE FOR CARRYING OUT THE INVENTION

Hereinafter, the present invention will be described in more detail.

The present inventors have conducted extensive studies to prepare a lithium nickel-cobalt-manganese-based positive electrode active material having high productivity and uniform and excellent quality, and as a result, the present invention has been accomplished on the basis of the finding that the above object has been achieved through performing a first heat treatment under a condition of relatively low temperature and abundant oxygen to prepare a pre-sintered mixture, pulverizing or classifying the same, and thereafter, performing a second heat treatment under a condition of relatively high temperature and insufficient oxygen.

Specifically, a method for preparing a positive electrode active material according to the present invention includes: a step (1) for adding a reaction mixture containing a lithium-raw material and a nickel-manganese-cobalt precursor into a first crucible and performing a first heat treatment at a temperature of 500-800° C. to form a pre-sintered mixture; a step (2) for extracting the pre-sintered mixture from the first crucible and pulverizing or classifying the same; and a step (3) for adding the pulverized or classified pre-sintered mixture into a second crucible and performing a second heat treatment at a temperature of 700-1000° C. under an atmosphere in which an oxygen partial pressure is 20% or less to form a lithium nickel-manganese-cobalt-based positive electrode active material, wherein a volume of the pre-sintered mixture formed after the first heat treatment is 20-50% with respect to a volume of the reaction mixture added into the first crucible.

Hereinafter, each step of the preparing method according the present invention will be described in more detail.

(1) Step for Forming Pre-Sintered Mixture

First, a reaction mixture containing a lithium-raw material and a nickel-manganese-cobalt precursor is added into a first crucible.

As the lithium-raw material, various lithium-raw materials known in the art may be used without limitation, and for example, lithium-containing carbonate (such as lithium carbonate), lithium-containing hydrate (such as lithium hydroxide monohydrate ($LiOH \cdot H_2O$)), lithium-containing hydroxide (such as lithium hydroxide), lithium-containing nitrate (such as lithium nitrate ($LiNO_3$)), or lithium-containing chloride (such as lithium chloride (LiCl)), etc. may be used. Preferably, the lithium-raw material may use at least one selected from the group consisting of lithium hydroxide and lithium carbonate.

As the nickel-manganese-cobalt precursor, various nickel-manganese-cobalt precursor materials known in the art may be used without limitation, and for example, the nickel-manganese-cobalt precursor may use at least one selected from the group consisting of nickel-manganese-cobalt hydroxide, nickel-manganese-cobalt oxyhydroxide, nickel-manganese-cobalt carbonate, and a nickel-manganese-cobalt organic complex.

The nickel-manganese-cobalt precursor may be used from commercial products, or may be prepared according to the method for preparing a nickel-manganese-cobalt transition metal precursor well known in the art.

For example, the nickel-manganese-cobalt transition metal precursor may be prepared by adding an ammonium cation-containing complex-forming agent and a basic compound into a metal solution containing a nickel-containing raw material, a cobalt-containing raw material, and a manganese-containing raw material, and by performing a coprecipitation reaction thereof.

The nickel-containing raw material may be, for example, nickel-containing acetate, nitrate, sulfate, halide, sulfide, hydroxide, oxide, or oxyhydroxide, and specifically, may be $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, nickel halide, or a combination thereof, but the present invention is not limited thereto.

The cobalt-containing raw material may be cobalt-containing acetate, nitrate, sulfate, halide, sulfide, hydroxide, oxide, or oxyhydroxide, and specifically, may be Co $(OH)_2$, CoOOH, Co $(OCOCH_3)_2 \cdot 4H_2O$, Co $(NO_3)_2 \cdot 6H_2O$, Co $(SO_4)_2 \cdot 7H_2O$, or a combination thereof, but the present invention is not limited thereto.

The manganese-containing raw material may be, for example, manganese-containing acetate, nitrate, sulfate, halide, sulfide, hydroxide, oxide, oxyhydroxide, or a combination thereof, and specifically, may be manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; manganese oxyhydroxide; manganese chloride; or a combination thereof, but the present invention is not limited thereto.

The metal solution may be prepared by adding a nickel-containing raw material, a cobalt-containing raw material, and a manganese-containing raw material into a solvent, specifically water or a mixed solvent of an organic solvent (e.g., alcohol, etc.) which is uniformly mixed with water, or by mixing an aqueous solution of a nickel-containing raw material, an aqueous solution of a cobalt-containing raw material, and an aqueous solution of a manganese-containing raw material.

The ammonium cation-containing complex-forming agent may be, for example, $NH_4OH$, $(NH_4)_2SO_4$, $NH_4NO_3$, $NH_4Cl$, $CH_3COONH_4$, $(NH_4)_2CO_3$, or a combination thereof, but the present invention is not limited thereto. Meanwhile, the ammonium cation-containing complex-forming agent may be used in an aqueous solution state, and as a solvent, water or a mixture of water and an organic solvent (specifically, alcohol, etc.) which is uniformly mixed with water may be used.

The basic compound may be hydroxide of an alkali metal or an alkaline earth metal such as NaOH, KOH, or $Ca(OH)_2$; hydrate thereof; or a combination thereof. The basic compound may also be used in an aqueous solution state, and as a solvent, water or a mixture of water and an organic solvent (specifically, alcohol, etc.) which is uniformly mixed with water may be used.

The basic compound is added to adjust a pH of the reaction solution and may be added in an amount such that the pH of the metal solution is 10.5-13, preferably 11-13.

On the other hand, the coprecipitation reaction may be performed at a temperature of 40-70° C. under an inert atmosphere such as nitrogen or argon.

A particle of nickel-manganese-cobalt hydroxide is produced and precipitated in the reaction solution through the above process. The precipitated nickel-manganese-cobalt hydroxide particle is separated and dried through the conventional method to obtain a transition metal precursor.

On the other hand, a content of the lithium-raw material and the nickel-manganese-cobalt precursor in the reaction mixture may be appropriately adjusted in consideration of a composition of the positive electrode active material to be finally obtained. For example, in the reaction mixture, the lithium-raw material and the nickel-manganese-cobalt precursor may be contained at an atomic ratio of lithium to transition metal ratio being 1:1.01-1.09, wherein the atomic ratio of the transition metal means the total atom number of the transition metal in which the atom numbers of nickel, cobalt, and manganese are combined.

On the other hand, the reaction mixture may further include a doping raw material for improving stability and physical properties of the positive electrode active material in addition to the lithium-raw material and the nickel-manganese-cobalt precursor. The doping raw material may be oxide, hydroxide, sulfide, oxyhydroxide, halide, or a mixture thereof containing at least one element selected from the group consisting of W, Cu, Fe, V, Cr, Ti, Zr, Zn, Al, In, Ta, Y, In, La, Sr, Ga, Sc, Gd, Sm, Ca, Ce, Nb, Mg, B, and Mo.

The reaction mixture containing the above components may be prepared through adding each component into a mixer or the like and solid-phase mixing the same, but the present invention is not limited thereto.

After the reaction mixture is added into the first crucible, the first heat treatment is performed at a temperature of 500-800° C., preferably 550-700° C.

When the first heat treatment is performed in the described temperature range, the lithium-raw material and the nickel-manganese-cobalt precursor are reacted to form the pre-sintered mixture in which lithium nickel-cobalt-manganese oxide having a spinel structure and a seed of lithium nickel-cobalt-manganese oxide having a layered structure are mixed. Reaction Scheme 1 below illustrates a reaction of the first heat treatment when LiOH is used as a lithium-raw material and nickel-manganese-cobalt hydroxide is used as a nickel-manganese-cobalt precursor:

$$LiOH+[Ni_aMn_bCo_c](OH)_2 \rightarrow Li[Ni_aMn_bCo_c]_2O_4,$$
$$Li[Ni_aMn_bCo_c]O_2 \quad \text{[Reaction Scheme 1]}$$

On the other hand, the volume of the pre-sintered mixture is reduced as compared with the reaction mixture because the pre-sintered mixture is formed by reacting with the nickel-manganese-cobalt precursor while the lithium-raw material having low density is dissolved.

Specifically, the volume of the pre-sintered mixture formed by the first heat treatment in the above temperature range is 20-50%, for example, 20-40% of the volume of the reaction mixture added in the first crucible. When the first heat treatment temperature is less than 500° C., an effect of the volume reduction is slight because a structure of the nickel-manganese-cobalt precursor, which is a raw material, is hardly changed even after the first heat treatment and the pre-sintered mixture is formed in a state that lithium is ununiformly adhered to the surface thereof. Accordingly, when the first heat treatment temperature is less than 500° C., an effect of the productivity improvement is deteriorated and quality uniformity of the finally produced positive electrode active material is also deteriorated. Meanwhile, when the first heat treatment temperature exceeds 800° C., there is a disadvantage that it is difficult to control crystal growth and properties of the finally produced positive electrode material because crystal growth rapidly occurs during the first heat treatment.

On the other hand, the first heat treatment may be performed for 1 hour or more, preferably for 3 hours or more, more preferably for 3-12 hours. When the first heat treatment time is 1 hour or more, there are advantages that a gas generated during the moisture and heat treatment is sufficiently removed and the crystal growth is easily controlled during the second heat treatment.

Furthermore, the first heat treatment may be performed under an oxygen atmosphere or an air atmosphere. As described above, when the firing is performed at the first heat treatment temperature, a lithium nickel-cobalt-manganese-based oxide having a spinel structure is formed, and since such a spinel structure is formed through the oxidation process as described in Reaction Scheme 1 above, the crystal size is increased and the cation mixing value is decreased under a high oxygen partial pressure condition. Therefore, it is preferable that the first heat treatment is performed under an oxygen atmosphere or an air atmosphere in which an oxygen partial pressure is high.

On the other hand, as the first crucible, a crucible generally used in the art such as a crucible formed of stainless steel, a crucible formed of nickel, an alloy crucible (e.g., Inconel, Hastelloy, etc.), or a crucible formed of aluminum may be used, and among the crucibles, it is preferable to use a crucible formed of stainless steel, a crucible formed of nickel, or an alloy crucible in a viewpoint of economy aspect. When a crucible formed of aluminum is used, it is difficult to use for a long time because it is easily damaged by the lithium-raw material. In contrast, when a crucible formed of stainless steel, a crucible formed of nickel, or an alloy crucible is used, there is an advantage of being more durable than a crucible formed of aluminum, but it is not suitable to be used in high-temperature firing exceeding 800° C. Therefore, conventionally, a crucible formed of aluminum has been mainly used in the preparation of the lithium nickel-manganese-cobalt-based positive electrode active material, but since the first heat treatment is performed at a heat treatment temperature of 800° C. or less, a crucible formed of stainless steel, a crucible formed of nickel, or an alloy crucible may be used, thereby reducing the cost of replacing the crucible.

(2) Step for Pulverizing or Classifying

When the pre-sintered mixture is formed through the first heat treatment, the formed pre-sintered mixture is extracted from the first crucible and pulverized or classified.

The pulverizing or classifying may be performed through a conventional pulverizing or classifying method known in the art, for example, a ball mill, a jet mill, or sieving, etc.

Through the pulverizing or classifying step, a tap density of the pre-sintered mixture is increased and impurities such as moisture and carbon dioxide are effectively removed, and as a result, a volume of the pre-sintered mixture is reduced and a larger amount of the pre-sintered mixture may be contained into the second crucible, thereby improving the productivity thereof.

In addition, in the step for pulverizing or classifying, the pre-sintered mixtures are uniformly mixed to further improve the quality uniformity of the positive electrode active material.

(3) Step for Forming Lithium Nickel-Manganese-Cobalt-Based Positive Electrode Active Material When the step for pulverizing or classifying is completed, the pulverized or classified pre-sintered mixture is added into the second crucible and the second heat treatment is performed at a temperature of 700-1000° C., preferably 750-1000° C. under an atmosphere in which an oxygen partial pressure is 20% or less to form a lithium nickel-manganese-cobalt-based positive electrode active material.

When the second heat treatment is performed at the described high temperature, the lithium nickel-manganese-cobalt oxide of the spinel structure in the pre-sintered mixture is converted into a layered structure and crystal growth of the lithium nickel-manganese-cobalt oxide seed having the layered structure occurs through a reaction as shown in Reaction Scheme 2 below:

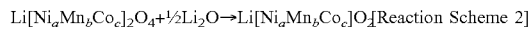

$\text{Li}[\text{Ni}_a\text{Mn}_b\text{Co}_c]_2\text{O}_4 + \frac{1}{2}\text{Li}_2\text{O} \rightarrow \text{Li}[\text{Ni}_a\text{Mn}_b\text{Co}_c]\text{O}_2$ [Reaction Scheme 2]

As described in Reaction Scheme 2, since the forming process of the lithium nickel-manganese-cobalt oxide having a layered structure is a reduction process, it is advantageous for the formation of a structure to be performed under a low oxygen partial pressure condition. Specifically, when the second heat treatment is performed at a low oxygen partial pressure, the crystal size is increased and the cation mixing is reduced. Accordingly, in the present invention, a positive electrode active material having excellent physical properties and electrochemical characteristics is prepared through performing the second heat treatment in which the layered structure is formed under a condition in which the oxygen partial pressure is 20% or less. Specifically, the second heat treatment may be performed under a nitrogen atmosphere, a vacuum atmosphere, or a non-fluid atmosphere, etc.

Generally, a gas such as $CO_2$ is generated during the firing process of the lithium-raw material and the nickel-manganese-cobalt precursor, and when the unnecessary gas such as $CO_2$ is generated, the oxygen partial pressure is reduced in the firing atmosphere, whereby a problem of deteriorating the physical properties of the positive electrode active material occurs. Accordingly, conventionally, the firing is generally performed under an oxygen atmosphere to prepare a positive electrode active material having high quality, but in the present invention, by-products such as $CO_2$ are not generated in the second heat treatment process because the $CO_2$ gas has been already generated during the first heat treatment. Therefore, even when the second heat treatment is performed under a low oxygen partial pressure atmosphere, a positive electrode active material having excellent quality may be prepared.

On the other hand, the secondary heat treatment may be performed for 2 hours or more, preferably 4 hours or more, more preferably 4-20 hours. When the second heat treatment is performed for less than 2 hours, the crystal growth does not sufficiently occur, and accordingly, when applied to a battery, life-time characteristics at a high temperature or storage characteristics may be deteriorated.

On the other hand, a content of the pre-sintered mixture added into the second crucible may be 2-10 times, preferably 2-6 times a content of the pre-sintered mixture formed from the first crucible. As described above, since the pre-sintered mixture has a reduced volume through the first heat treatment compared with the reaction mixture, a larger amount of the pre-sintered mixture may be added into the second crucible compared with directly adding the reaction mixture. Accordingly, a larger amount of the positive electrode active material may be obtained in the crucible having the same volume as the conventional crucibles by maximizing the content of the pre-sintered mixture added into the second crucible.

On the other hand, since the second heat treatment is performed at a high temperature, it is preferable that the second crucible is a crucible formed of aluminum.

Furthermore, although it is not essential in the preparing method of the present invention, a doping raw material may be further added to the second crucible before the second heat treatment as necessary to improve the stability and physical properties of the positive electrode active material. As the doping material, oxide, hydroxide, sulfide, oxyhydroxide, halide, or a mixture thereof containing at least one element selected from the group consisting of W, Cu, Fe, V, Cr, Ti, Zr, Zn, Al, In, Ta, Y, In, La, Sr, Ga, Sc, Gd, Sm, Ca, Ce, Nb, Mg, B, and Mo may be used.

The lithium nickel-manganese-cobalt-based positive electrode active material prepared through the preparing method of the present invention may be represented by Formula 1 below:

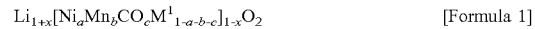

$\text{Li}_{1+x}[\text{Ni}_a\text{Mn}_b\text{CO}_c\text{M}^1_{1-a-b-c}]_{1-x}\text{O}_2$ [Formula 1]

In Formula 1, $-0.2 \leq x \leq 0.2$, $0 < a < 1$, $0 < b < 1$, $0 < c < 1$, and $M^1$ is at least one selected from the group consisting of W, Cu, Fe, V, Cr, Ti, Zr, Zn, Al, In, Ta, Y, In, La, Sr, Ga, Sc, Gd, Sm, Ca, Ce, Nb, Mg, B, and Mo.

a, b, and c each represents an atomic fraction of Ni, Mn, and Co, for example, $0.01 \leq a \leq 0.98$, $0.01 \leq b \leq 0.98$, and $0.01 \leq c \leq 0.98$, specifically $0.5 \leq a \leq 0.98$, $0.01 \leq b$ $0.49$, and $0.01 \leq c \leq 0.49$, more specifically $0.6 \leq a \leq 0.98$, $0.01 \leq b \leq 0.39$, and $0.01 \leq c \leq 0.39$, but the present invention is not limited thereto.

In the method of the present invention, during the first heat treatment performed at a low temperature to form a spinel structure, the firing is performed under an atmosphere in which an oxygen content is relatively high, and during the second heat treatment performed at a high temperature to form a layered structure, the firing is performed under an atmosphere in which an oxygen content is relatively low, so that a positive electrode active material having a large crystal size and a small amount of cation mixing may be prepared.

In addition, in the method of the present invention, a relatively large amount of the pre-sintered mixture is added into the crucible for the second heat treatment because the first heat treatment is performed to form the pre-sintered mixture having the reduced volume as compared with the reaction mixture, and accordingly, productivity is greatly excellent.

In addition, reaction by-products such as moisture and $CO_2$ are generated in the first heat treatment and the second heat treatment is performed using the pre-sintered mixture in which such moisture and $CO_2$ are removed, and accordingly, deterioration of the firing atmosphere and deterioration of the positive electrode active material characteristics by the reaction by-products may be minimized and a positive electrode active material having excellent and uniform quality may be prepared.

Hereinafter, the present invention will be described in more detail with reference to specific examples.

Example 1

LiOH and $\text{Ni}_{0.8}\text{Co}_{0.1}\text{Mn}_{0.1}(\text{OH})_2$ were mixed in a mixer at a weight ratio of 1.01:1 to form a reaction mixture, and then, 7500 g (volume: 8000 ml) of the reaction mixture was added into a crucible formed of stainless steel and a first heat treatment is performed at 600° C. under an oxygen atmosphere for 5 hours to form a pre-sintered mixture, and thereafter, the pre-sintered mixture was cooled. The volume of the prepared pre-sintered mixture was 2000 ml and the weight of the pre-sintered mixture was about 5000 g.

10000 g (volume: 8000 ml) of the above pre-sintered mixture was pulverized and sieved, and then, the pulverized pre-sintered mixture was added into a crucible formed of aluminum and a second heat treatment is performed at 800° C. under a nitrogen atmosphere for 10 hours to prepare a positive electrode active material.

Example 2

$Li_2CO_3$ and $Ni_{0.6}Co_{0.2}Mn_{0.2}(OH)_2$ were mixed in a mixer at a weight ratio of 1.07:1 to form a reaction mixture, and then, 7500 g (volume: 8000 ml) of the reaction mixture was added into a crucible formed of stainless steel and a first heat treatment is performed at 750° C. under an oxygen atmosphere for 5 hours to form a pre-sintered mixture, and thereafter, the pre-sintered mixture was cooled. The volume of the prepared pre-sintered mixture was 2000 ml and the weight of the pre-sintered mixture was about 5000 g.

10000 g (volume: 8000 ml) of the above pre-sintered mixture was pulverized and sieved, and then, the pulverized pre-sintered mixture was added into a crucible formed of aluminum and a second heat treatment is performed at 830° C. under a nitrogen atmosphere for 13 hours to prepare a positive electrode active material.

Comparative Example 1

A positive electrode active material was prepared in the same method as in Example 1 except that the second heat treatment was performed under an oxygen atmosphere.

Comparative Example 2

A positive electrode active material was prepared in the same method as in Example 2 except that the second heat treatment was performed under an oxygen atmosphere.

Comparative Example 3

A positive electrode active material was prepared in the same method as in Example 1 except that the first heat treatment was performed at 300° C. A volume of the pre-sintered mixture prepared after the first heat treatment was 7500 ml, and volume reduction was hardly occurred. In addition, a weight of the pre-sintered mixture was about 6700 g. It is considered that a weight reduction ratio of the pre-sintered mixture in Comparative Example 3 is smaller than that in Examples 1 and 2 because the first heat treatment temperature is low, whereby moisture and gas removal rates are also low.

Comparative Example 4

$Li_2CO_3$ and $Ni_{0.6}Co_{0.2}Mn_{0.2}(OH)_2$ were mixed in a mixer at a weight ratio of 1.07:1 to form a reaction mixture, and then, 7500 g (volume: 8000 ml) of the reaction mixture was added into a crucible formed of aluminum and a first heat treatment is performed at 750° C. under an oxygen atmosphere for 5 hours to form a pre-sintered mixture, and thereafter, the pre-sintered mixture was cooled.

Thereafter, a second heat treatment was performed in the same crucible at 830° C. under a nitrogen atmosphere for 13 hours to form a positive electrode active material without performing the step for extracting the pre-sintered mixture from the crucible formed of aluminum, and pulverizing and sieving the same.

Experimental Example 1: Measurement for Crystal Size and Cation Mixing of Positive Electrode Active Material Crystal size and cation mixing value of the positive electrode active materials prepared in Examples 1 and 2 and Comparative Examples 1, 2, and 4 were measured by XRD refinement analysis, and the measured results are shown in Table 1 below.

TABLE 1

| | Crystal size (nm) | Cation mixing value (%) |
|---|---|---|
| Example 1 | 160.7 | 0.0139 |
| Example 2 | 184.6 | 0.0251 |
| Comparative Example 1 | 103.05 | 0.0215 |
| Comparative Example 2 | 149.8 | 0.0346 |
| Comparative Example 4 | 184 | 0.0263 |

As shown in Table 1 above, the positive electrode active materials of Examples 1 and 2, in which the first heat treatment was performed under an oxygen atmosphere and the second heat treatment was performed under a nitrogen atmosphere, had larger crystal size and smaller cation mixing ratio than those of the positive electrode active materials of Comparative Examples 1 and 2, in which both the first heat treatment and the second heat treatment were performed under an oxygen atmosphere. Meanwhile, it is confirmed that the positive electrode active material of Comparative Example 4 had a crystal size similar to that of Example 2, but the cation mixing ratio was higher than that of Example 2.

Experimental Example 2: Evaluation of Life Characteristics and Resistance Increase Rate The positive electrode active materials prepared in Examples 1 and 2 and Comparative Examples 1, 2, and 4 and a PvdF binder, and carbon black were dispersed in an NMP solution at a weight ratio of 97.5:1.5:1.0 to prepare a slurry, and then, the slurry was applied to an Al current collector. Thereafter, rolled by a roll press to prepare a positive electrode.

In addition, natural graphite as a negative electrode active material, carbon black as a conductive material, and PVdF as a binder were mixed in an N-methylpyrrolidone solvent at a weight ratio of 95.6:1.0:3.4 to prepare a composition for forming a negative electrode, and then, the composition was applied to a copper current collector to prepare a negative electrode.

A separator formed of porous polyethylene was interposed between the positive electrode and the negative electrode prepared through the described method to produce an electrode assembly, and the electrode assembly was disposed in a case, and thereafter, an electrolyte solution was injected into the case to manufacture a coin cell lithium secondary battery. At this time, the electrolyte solution was prepared by dissolving 0.7 M of lithium hexafluorophosphate (LiPF$_6$) in an organic solvent composed of ethylene carbonate and ethylmethyl carbonate (mixing volume ratio of EC:EMC=3:7).

The coin cell manufactured through the described method was charged and discharged twice at room temperature under conditions of a final charge voltage 4.25 V, a final discharge voltage 2.5 V, and 0.1 C/0.1 C, and then, initial charge/discharge capacity and initial resistance were measured. Thereafter, capacity retention (%) and resistance increase rate (DCR increase (%)) after 50 cycles were measured while charge and discharge were performed at 45° C. under conditions of a final charge voltage 4.25 V, a final discharge voltage 2.5 V, and 0.3 C/0.3 C. The measurement results are shown in Table 2.

TABLE 2

| Division | Initial capacity (mA/g) Charge/Discharge | Initial resistance (Ω) | Capacity retention after 50 cycles (%) | Resistance increase rate after 50 cycles (%) |
|---|---|---|---|---|
| Example 1 | 228.8/211.3 | 13.54 | 94.5 | 170.9 |
| Example 2 | 197.7/186.0 | 11.23 | 97.5 | 178.9 |
| Comparative Example 1 | 226.3/210.0 | 14.21 | 93.8 | 211.5 |
| Comparative Example 2 | 196.3/184.2 | 12.34 | 96.3 | 223.2 |
| Comparative Example 4 | 197.2/184.5 | 12.1 | 96.9 | 247.1 |

It is confirmed from Table 2 above that the batteries using the positive electrode active materials in Examples 1 and 2 have excellent capacity and cycle characteristics as compared with the batteries using the positive electrode active materials in Comparative Examples 1, 2 and 4.

The invention claimed is:

1. A method for preparing a positive electrode active material comprising:

adding a reaction mixture containing a lithium-raw material and a nickel-manganese-cobalt precursor into a first crucible and performing a first heat treatment at a temperature of 500-800° C. under an oxygen atmosphere to form a pre-sintered mixture;

extracting the pre-sintered mixture from the first crucible and pulverizing or classifying the pre-sintered mixture; and directly after the pulverizing or classifying of the pre-sintered mixture, adding the pulverized or classified pre-sintered mixture into a second crucible and performing a second heat treatment at a temperature of 700-1000° C. under an atmosphere in which an oxygen partial pressure is 20% or less to form a lithium nickel-manganese-cobalt-based positive electrode active material, wherein during the first heat treatment a volume of the pre-sintered mixture is reduced to a volume that is 20-50% of a volume of the reaction mixture added into the first crucible, wherein the oxygen partial pressure of the second heat treatment is lower than that of the first heat treatment, and wherein the lithium nickel-manganese-cobalt-based positive electrode active material is represented by Formula 1 below:

$$Li_{1+x}[Ni_aMn_bCo_cM^1_{1-a-b-c}]_{1-x}O_2 \qquad \text{[Formula 1]}$$

wherein, 0.2≤x≤0.2, 0.6≤a≤0.98, 0.01≤b≤0.39 and 0.01≤c≤0.39, and $M^1$ is at least one selected from the group consisting of Cu, Fe, V, Cr, Ti, Zr, Zn, Al, In, Ta, Y, In, La, Sr, Ga, Sc, Gd, Sm, Ca, Ce, Nb, Mg, B, and Mo.

2. The method of claim 1, wherein the second heat treatment is performed under a nitrogen atmosphere, a vacuum atmosphere, or a non-fluid atmosphere.

3. The method of claim 1, wherein the lithium-raw material is at least one selected from the group consisting of lithium hydroxide and lithium carbonate.

4. The method of claim 1, wherein the nickel-manganese-cobalt precursor is at least one selected from the group consisting of nickel-manganese-cobalt hydroxide, nickel-manganese-cobalt oxyhydroxide, nickel-manganese-cobalt carbonate, and a nickel-manganese-cobalt organic complex.

5. The method of claim 1, wherein the reaction mixture further comprises a doping raw material.

6. The method of claim 5, wherein the doping raw material is oxide, hydroxide, sulfide, oxyhydroxide, halide, or a mixture thereof comprising Cu, Fe, V, Cr, Ti, Zr, Zn, Al, In, Ta, Y, In, La, Sr, Ga, Sc, Gd, Sm, Ca, Ce, Nb, Mg, B, Mo or combination thereof.

7. The method of claim 1, wherein the first crucible is a crucible formed of stainless steel, a crucible formed of nickel, or an alloy crucible.

8. The method of claim 1, wherein the first heat treatment is performed for 1 hour to 12 hours.

9. The method of claim 1, wherein a content of the sintered mixture added into the second crucible is 2-10 times a content of the sintered mixture formed from the first crucible.

10. The method of claim 1, wherein the second crucible is a crucible formed of aluminum.

11. The method of claim 1, further comprising adding a doping raw material to the second crucible before the second heat treatment.

12. The method of claim 1, wherein the second heat treatment is performed for 2 hours to 20 hours.

* * * * *